(12) United States Patent
Takahashi

(10) Patent No.: US 8,097,367 B2
(45) Date of Patent: Jan. 17, 2012

(54) NON-AQUEOUS ELECTROLYTE SECONDARY CELL CONTAINING 1,3-DIOXANE COMPOUND

(75) Inventor: Kentaro Takahashi, Moriguchi (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 1146 days.

(21) Appl. No.: 11/902,995

(22) Filed: Sep. 27, 2007

(65) Prior Publication Data

US 2008/0081261 A1 Apr. 3, 2008

(30) Foreign Application Priority Data

Sep. 28, 2006 (JP) .................................. 2006-263726

(51) Int. Cl.
 *H01M 4/13* (2010.01)
 *H01M 4/58* (2010.01)
 *H01M 4/62* (2010.01)
 *H01M 6/16* (2010.01)
(52) U.S. Cl. .................... 429/337; 429/231.2; 429/232; 429/329; 429/338
(58) Field of Classification Search ................ 429/231.3, 429/232
See application file for complete search history.

(56) References Cited

U.S. PATENT DOCUMENTS

| | | | |
|---|---|---|---|
| 7,083,878 B2 | 8/2006 | Kotato et al. | |
| 2005/0019659 A1* | 1/2005 | Shiozaki et al. | 429/231.3 |
| 2005/0058907 A1* | 3/2005 | Kurihara et al. | 429/232 |

FOREIGN PATENT DOCUMENTS

| | | |
|---|---|---|
| JP | 5-36407 A | 2/1993 |
| JP | 2000-299129 A | 10/2000 |
| JP | 2005-32701 A | 2/2005 |
| JP | 2005-183195 A | 7/2005 |

* cited by examiner

*Primary Examiner* — Barbara Gilliam
*Assistant Examiner* — Steven Scully

(57) ABSTRACT

A non-aqueous electrolyte secondary cell with superior cycle characteristics is provided. The non-aqueous electrolyte secondary cell has a positive electrode, a negative electrode, and a non-aqueous electrolyte containing a non-aqueous solvent and an electrolyte salt. The non-aqueous solvent contains ethylene carbonate and propylene carbonate. The ratio of the ethylene carbonate to the total mass of the ethylene carbonate and the propylene carbonate is from 0.40 to 0.78. The non-aqueous electrolyte contains a 1,3-dioxane compound at a mass % of from 0.1 to 5.0. The 1,3-dioxane compound is represented by Formula 1:

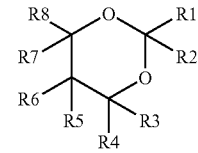

where R1 to R4 independently denote a hydrogen atom, a methyl group, or an ethyl group.

8 Claims, 2 Drawing Sheets

NON-AQUEOUS ELECTROLYTE SECONDARY CELL CONTAINING 1,3-DIOXANE COMPOUND

BACKGROUND OF THE INVENTION

1) Field of the Invention

The present invention relates to an improvement of a non-aqueous electrolyte secondary cell for the purpose of improving discharging characteristics.

2) Description of the Related Art

In recent years, there has been a rapid reduction in size and weight of mobile information terminals such as mobile phones, notebook personal computers, and PDAs. As the driving power sources for the terminals, non-aqueous electrolyte secondary cells, which have a high energy density and capacity, are widely used.

As a non-aqueous solvent used for the non-aqueous electrolyte of such non-aqueous electrolyte secondary cells, ethylene carbonate (EC) and propylene carbonate (PC), which excel in electrical characteristics, are used.

EC has the advantage of providing a stable covering film with high lithium ion conductivity as a result of reaction with the negative electrode. However, EC is low in oxidative decomposition potential, and thus, is decomposed as a result of reaction with the positive electrode, which generates gas causing the cell to swell. Also, lowness of oxidative decomposition potential poses the problem of a reduction in discharging capacity.

PC, which is high in oxidative decomposition potential, does not pose the problems that EC does. Still, PC forms coating film that is low in lithium ion conductivity as a result of reaction with the negative electrode. This poses the problem of reduced discharging capacity.

Thus, there is a need for a non-aqueous solvent that eliminates the inconveniences encountered with EC and PC.

Japanese Patent Application Publication No. 5-36407 (patent document 1) suggests a technique related to a non-aqueous electrolyte secondary cell.

Patent document 1 uses lithium or a lithium alloy for the negative electrode, and chemical manganese dioxide baked at 440° C. for the active material of the positive electrode. For the electrolytic solution to be immersed in the separator, a solute of lithium trifluoromethane sulfonic acid is dissolved in a mixture of propylene carbonate, ethylene carbonate, 1,3-dioxolane, and dimethoxyethane.

This technique shortens the time for heat treatment for removing moisture out of the positive electrode active material, resulting in a non-aqueous electrolyte secondary cell with sufficient discharging characteristics even during high-load discharging under low temperature.

However, this technique cannot overcome the inconveniences with EC and PC.

SUMMARY OF THE INVENTION

The present invention has been accomplished in view of the above inconveniences, and it is an object of the present invention to provide a non-aqueous electrolyte secondary cell with superior cycle characteristics and minimized generation of gas when the non-aqueous is dissolved.

According to the present invention, a non-aqueous electrolyte secondary cell includes: a positive electrode; a negative electrode; and a non-aqueous electrolyte containing a non-aqueous solvent and an electrolyte salt. The non-aqueous solvent contains ethylene carbonate and propylene carbonate, the ratio of the ethylene carbonate to the total mass of the ethylene carbonate and the propylene carbonate being from 0.40 to 0.78. The non-aqueous electrolyte contains a 1,3-dioxane compound at a mass % of from 0.1 to 5.0. The 1,3-dioxane compound being represented by Formula 1 is represented by Formula 1:

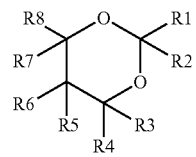

where R1 to R8 independently denote a hydrogen atom, a methyl group, or an ethyl group.

In this structure, the non-aqueous electrolyte contains a 1,3-dioxane compound (DOX), which has lower oxidative decomposition potential than ethylene carbonate (EC). This causes DOX to react with the positive electrode before EC does so that DOX is oxidative-decomposed to form a stable coating film on the positive electrode surface. The coating film acts to inhibit decomposition of EC. This minimizes the amount of gas generated as a result of decomposition of EC, and a reduction in discharging capacity, which results from decomposition of EC.

If the mixture ratio of EC to the total mass of EC and PC is low, PC may be reductive-decomposed at the negative electrode to form a coating film that is low in lithium ion conductivity, resulting in a reduction in discharging capacity. If, on the other hand, the mixture ratio of EC to the total mass of EC and PC is high, even the addition of the 1,3-dioxane compound cannot inhibit the oxidative decomposition of EC at the positive electrode, and thus, the amount of gas generation increases, resulting in a reduction in discharging capacity. The present invention restricts the ratio of EC to the total mass of EC and PC within the claimed range as well as adding the 1,3-dioxane compound, thereby providing a non-aqueous electrolyte secondary cell with high discharging capacity.

If the amount of the 1,3-dioxane compound added is excessively small, the desired advantageous effects cannot be obtained. If, on the other hand, the amount of the 1,3-dioxane compound added is excessively large, the decomposition product of the 1,3-dioxane compound prevents smooth migration of lithium ions, resulting in a reduction in discharging capacity. In view of this, the amount of the 1,3-dioxane compound added is restricted within the range of from 0.1 to 5.0 mass %. More preferably, the amount of the 1,3-dioxane compound added is from 0.5 to 3.0 mass %.

The "mass % of the 1,3-dioxane compound", as used herein, is relative to the total mass of the non-aqueous solvent, electrolyte salt, and 1,3-dioxane compound, which is assumed to be 100 here. Two or more kinds of 1,3-dioxane compound may be added within the above range.

In the above structure, the combined volume of the ethylene carbonate and the propylene carbonate may be from 20 to 100 volume % of the total volume of the non-aqueous solvent at 1 atm. and 25° C.

If the content of the ethylene carbonate and the propylene carbonate is excessively small, the electrical characteristics of the non-aqueous solvent become low. In view of this, the combined volume of the ethylene carbonate and the propylene carbonate relative to the total volume of the non-aqueous solvent is equal to or more than 20 volume % at 1 atm. and 25° C. A non-aqueous solvent made only of ethylene carbonate and propylene carbonate has high electrical characteristics and thus provides a smooth charging or discharging reaction. In view of this, the upper limit of the combined volume of the ethylene carbonate and the propylene carbonate relative to the total volume of the non-aqueous solvent is 100 volume %. It is noted that since ethylene carbonate is solid at room temperature (25° C.), the non-aqueous solvent cannot be made of ethylene carbonate alone.

Figure 1:
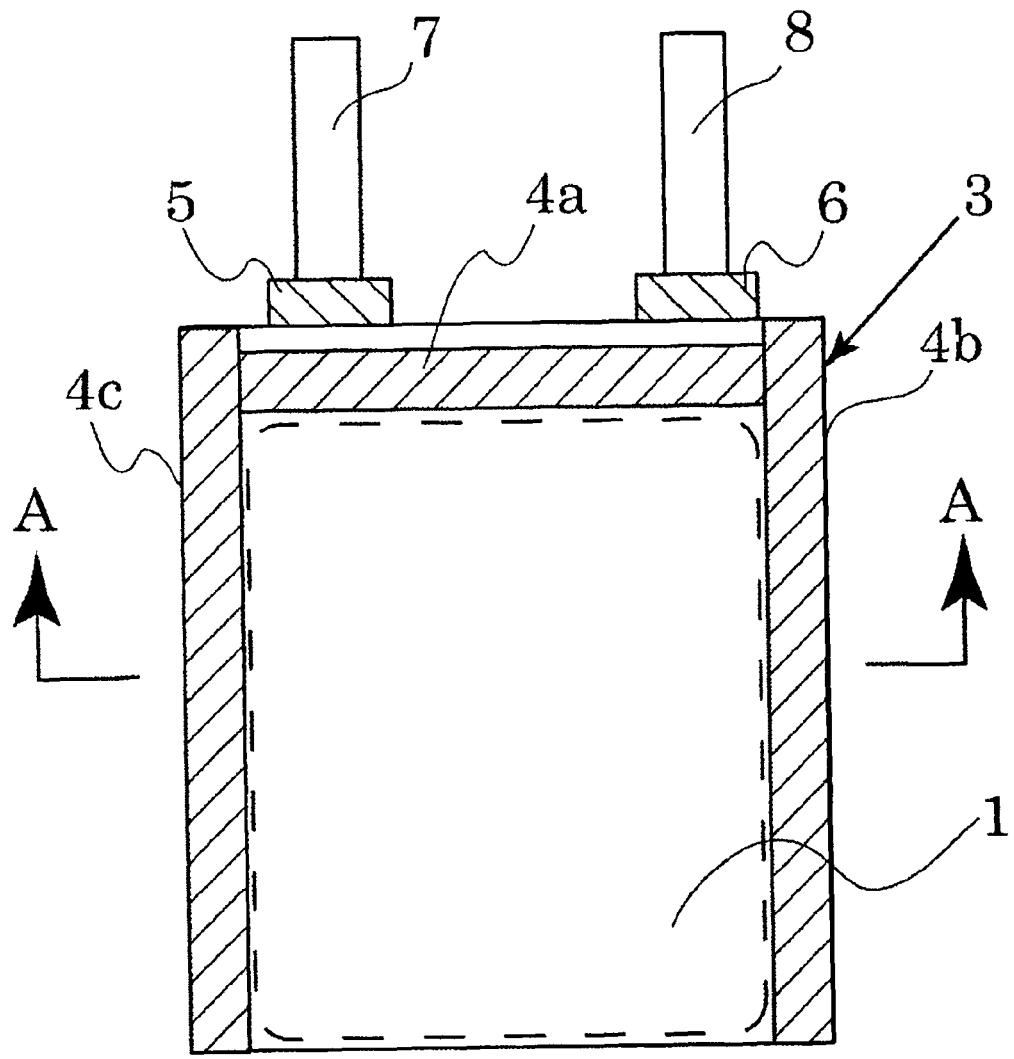
FIG. 1 is a frontal perspective view of a cell with a film outer casing according to the present invention.

REFERENCE MARKS IN THE DRAWINGS 1 electrode assembly
2 storage space
3 film outer casing
4a, 4b, 4c sealed portions
5 positive electrode tab film
6 negative electrode tab film
7 positive electrode lead
8 negative electrode lead
9 positive electrode
10 negative electrode
11 separator

DESCRIPTION OF PREFERRED EMBODIMENT

Figure 2:
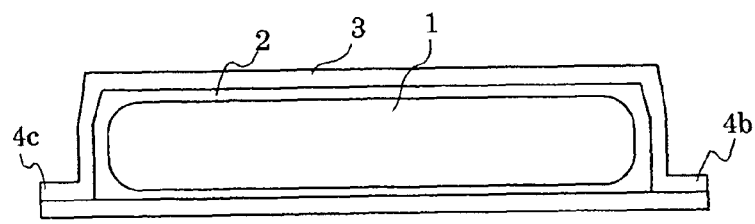
FIG. 2 is a sectional view of the cell taken along the line A-A shown in FIG. 1.
Figure 3:
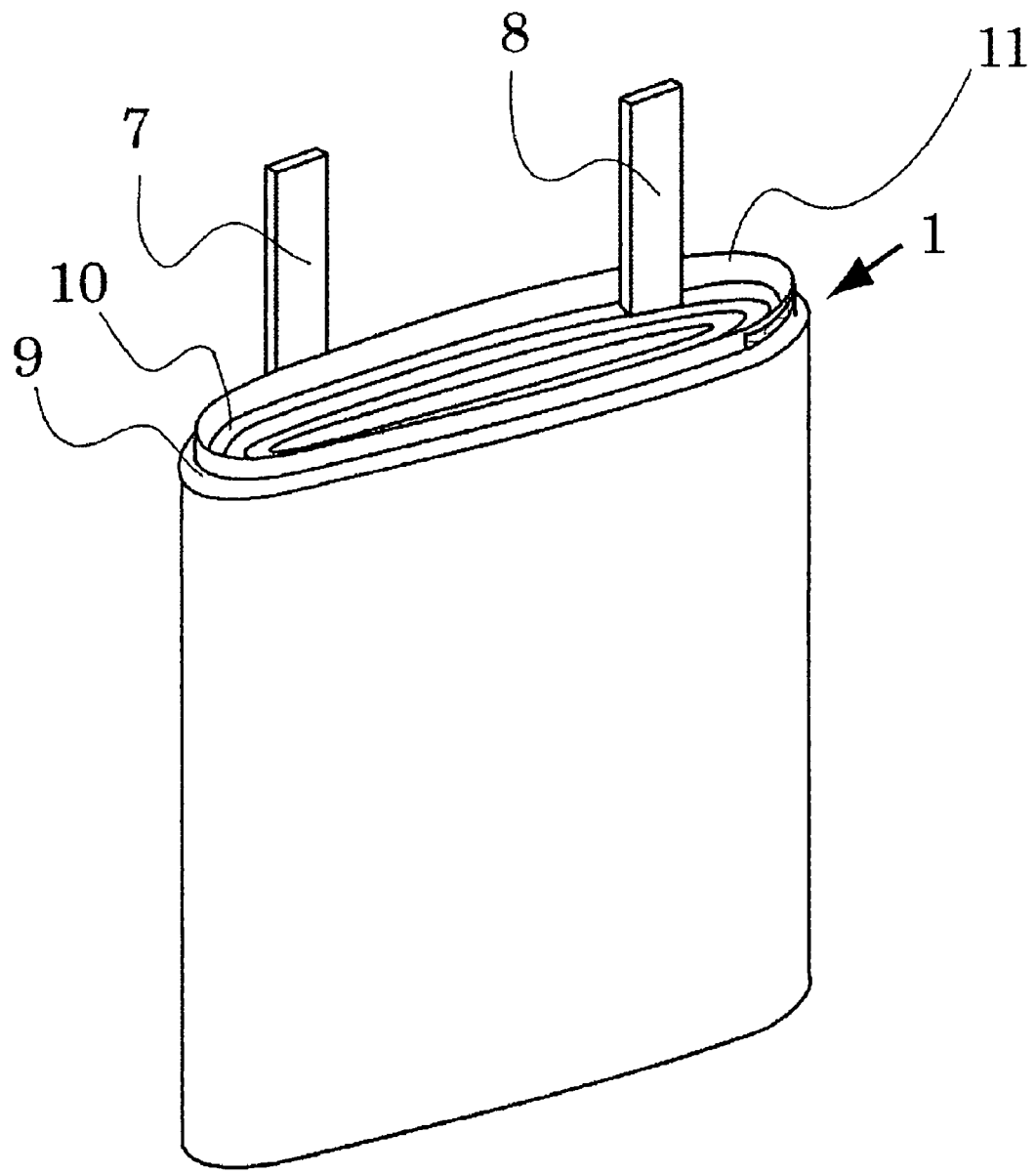
FIG. 3 is a perspective view of a flat electrode assembly used in the present invention.

A preferred embodiment of the present invention will be described in detail with reference to examples. FIG. 1 is a frontal perspective view of a cell with a film outer casing according to this embodiment the present invention. FIG. 2 is a sectional view of the cell taken along the line A-A shown in FIG. 1. FIG. 3 is a perspective view of a flat electrode assembly used in the present invention.

Referring to FIG. 2, the non-aqueous electrolyte secondary cell according to the present invention has an electrode assembly 1, which is disposed in a storage space 2 of a laminate outer casing 3. The storage space 2 is formed by sealing the upper edge, right side edge and left side edge of the laminate outer casing 3 respectively at sealed portions 4a, 4b, and 4c, as shown in FIG. 1. Also the storage space 2 accommodates a non-aqueous electrolyte containing a non-aqueous solvent and an electrolyte salt.

Referring to FIG. 3, the electrode assembly 1 has a positive electrode 9, a negative electrode 10, and a separator separating the electrodes from one another, which are wound into a flat form.

The positive electrode 9 and the negative electrode 10 are respectively connected to a positive electrode lead 7 made of aluminum and a negative electrode lead 8 made of copper, so that chemical energy generated inside the cell is extracted outside as electrical energy. The electrode leads 7 and 8 are respectively attached with tab films 5 and 6.

The laminate outer casing 3 is of a structure with a lamination of a nylon layer, an aluminum film, and a non-extruded polypropylene layer.

It is noted that in the present invention the outer casing is not limited to the above one with using an aluminum laminate material; the present invention will also find applications in cylindrical cells, rectangular cells, or coin-shaped cells.

A method for producing the cell of the above structure will now be described. It is noted that materials used in the present invention will not be limited to those described below; known materials may be used instead.

<Preparation of the Positive Electrode>

Ninety-two mass parts of a positive electrode active material made of a cobalt lithium compound oxide ($LiCoO_2$), and 5 mass parts of a conducting agent made of acetylene black, 3 mass parts of a binding agent made of polyvinylidene fluoride (PVDF), and N-Methyl-2-Pyrrolidone (NMP) were mixed together, thus preparing a positive electrode active material slurry.

Next, the positive electrode active material slurry was applied to both surfaces of a positive electrode core made of an aluminum foil of 15 μm thick so that the thickness would be uniform. Then, this electrode plate was passed through a drier to be dried, thereby removing the organic solvent that was used during slurry preparation. After dried, the electrode plate was extended in a roll presser to a thickness of 0.12 mm, thus obtaining the positive electrode 9.

<Preparation of the Negative Electrode>

Ninety-three mass parts of a negative electrode active material made of natural graphite ($d_{002}$=0.335 nm) and 7 mass parts of a binding agent made of polyvinylidene fluoride (PVDF), and N-Methyl-2-Pyrrolidone (NMP) were mixed together, thus preparing a negative electrode active material slurry. The negative electrode active material slurry was applied to both surfaces of a negative electrode core made of a copper foil (10 μm thick) so that the thickness would be uniform. Then, this electrode plate was passed through a drier to remove the organic solvent that was used during the slurry preparation. After dried, the electrode plate was extended in a roll presser to a thickness of 0.13 mm, thus obtaining the negative electrode 10.

<Preparation of the Non-Aqueous Electrolyte>

In a mixture solvent of ethylene carbonate (EC), propylene carbonate (PC), diethyl carbonate (DEC), and ethyl methyl carbonate (EMC), $LiPF_6$ as the electrolyte salt was dissolved at a rate of 1.0 (mol/liter), thus obtaining an electrolytic solution. To 98.5 mass parts of this electrolytic solution, 1.5 mass parts of 1,3-dioxane (DOX) was added, thus obtaining a non-aqueous electrolyte.

<Preparation of the Electrode Assembly>

To the positive and negative electrodes thus prepared, the positive and negative leads 7 and 8 were respectively attached. Then the electrodes were superposed onto one another with a separator made of a polyolefin porous film (0.016 mm thick) disposed between the electrodes, in such a manner that the center line in the width direction of the electrodes would agree to one another. Then the resulting product was wound using a winder and taped at the outermost surface, thus completing the flat electrode assembly 1.

<Assembly of the Cell>

A laminate film was molded into a cup form (concave form) to form the storage space 2, into which the flat electrode assembly 1 was inserted. Then the film was folded to form the bottom. Both side edges of the film, which communicated with the bottom, were heat-fused into the side sealed portions 4b and 4c. Through the opening portion from which the tab was protruding, the non-aqueous electrolyte was injected. After depressurization, charging, and sealing of the opening portion, the non-aqueous electrolyte secondary cell according to this embodiment was completed.

EXAMPLES

The present invention will be described in further detail with reference to examples.

Example 1

A non-aqueous electrolyte secondary cell according to example 1 was prepared in the same manner as in the embodiment except that the solvent was a mixture of 50 mass parts of ethylene carbonate (EC) and 50 mass parts of propylene carbonate (PC).

Example 2

A non-aqueous electrolyte secondary cell according to example 2 was was prepared in the same manner as in example 1 except that the content of the 1,3-dioxane (DOX) was 0.1 mass %.

Example 3

A non-aqueous electrolyte secondary cell according to example 3 was prepared in the same manner as in example 1 except that the content of the 1,3-dioxane (DOX) was 0.5 mass %.

Example 4

A non-aqueous electrolyte secondary cell according to example 4 was prepared in the same manner as in example 1 except that the content of the 1,3-dioxane (DOX) was 3.0 mass %.

Example 5

A non-aqueous electrolyte secondary cell according to example 5 was prepared in the same manner as in example 1 except that the content of the 1,3-dioxane (DOX) was 5.0 mass %.

Example 6

A non-aqueous electrolyte secondary cell according to example 6 was prepared in the same manner as in example 1 except that instead of 1,3-dioxane (DOX), 2-methyl-1,3-dioxane (2-Me-DOX) was used.

Example 7

A non-aqueous electrolyte secondary cell according to example 7 was prepared in the same manner as in example 1 except that instead of 1,3-dioxane (DOX), 4-methyl-1,3-dioxane (4-Me-DOX) was used.

Example 8

A non-aqueous electrolyte secondary cell according to example 8 was prepared in the same manner as in example 1 except that instead of 1,3-dioxane (DOX), 2,4-dimethyl-1,3-dioxane (2,4-DMe-DOX) was used.

Example 9

A non-aqueous electrolyte secondary cell according to example 9 was prepared in the same manner as in example 1 except that instead of 1,3-dioxane (DOX), 4-ethyl-1,3-dioxane (4-Et-DOX) was used.

Comparative Example 1

A non-aqueous electrolyte secondary cell according to comparative example 1 was prepared in the same manner as in example 1 except that the 1,3-dioxane was not added.

Comparative Example 2

A non-aqueous electrolyte secondary cell according to comparative example 2 was prepared in the same manner as in example 1 except that the content of the 1,3-dioxane was 0.05 mass %.

Comparative Example 3

A non-aqueous electrolyte secondary cell according to comparative example 3 was prepared in the same manner as in example 1 except that the content of the 1,3-dioxane was 6.0 mass %.

[Cell Characteristics Tests]

The cells thus prepared were subjected to tests under the following conditions. The results are shown in Table 1.

(60° C. Cycle Characteristics Test)

Charging Conditions: Each cell was charged at a constant current of 1.0 It (750 mA) to a voltage of 4.2 V, then at a constant voltage of 4.2 V for totally 3 hours at 60° C.

Discharging Conditions: Each cell was charged at a constant current of 1.0 It (750 mA) to a voltage of 2.75 V at 60° C.

Cycle Characteristics (%): 500th cycle discharge capacity/1st cycle discharge capacity×100.

(80° C. Charging Preservation Characteristics Test)

Charging Conditions: Each cell was charged at a constant current of 1.0 It (750 mA) to a voltage of 4.2 V, then at a constant voltage of 4.2 V for totally 3 hours at 23° C.

Preservation Conditions: A thermostatic chamber of 80° C., 96 hours.

Measurement of Gas Generation: Part of the outer casing after preservation is cut open, followed by gas collection by water substitution and measurement of the gas.

Discharging Conditions: Each cell was charged at a constant current of 1.0 It (750 mA) to a voltage of 2.75 V at 23° C.

Capacity Preservation Rate (%)=Discharging Capacity after Preservation/Discharging Capacity before Preservation×100.

TABLE 1

| | Compound | Content (mass %) | Cycle characteristics (%) | Charging Preservation Characteristics Test | |
|---|---|---|---|---|---|
| | | | | Gas generation (ml) | Preservation rate (%) |
| Com. Ex. 1 | — | 0.0 | 44 | 3.1 | 25 |
| Com. Ex. 2 | DOX | 0.05 | 47 | 2.9 | 33 |
| Ex. 2 | DOX | 0.1 | 64 | 2.3 | 69 |
| Ex. 3 | DOX | 0.5 | 75 | 1.9 | 79 |
| Ex. 1 | DOX | 1.5 | 81 | 1.7 | 82 |
| Ex. 4 | DOX | 3.0 | 80 | 1.7 | 84 |
| Ex. 5 | DOX | 5.0 | 73 | 1.8 | 70 |
| Com. Ex. 3 | DOX | 6.0 | 48 | 1.8 | 38 |
| Ex. 6 | 2-Me-DOX | 1.5 | 79 | 2.1 | 77 |
| Ex. 7 | 4-Me-DOX | 1.5 | 80 | 1.8 | 78 |
| Ex. 8 | 2,4-DMe-DOX | 1.5 | 80 | 1.9 | 76 |
| Ex. 9 | 4-Et-DOX | 1.5 | 76 | 2.0 | 79 |

Table 1 shows that in examples 1 to 5, where the content of the 1,3-dioxane (DOX) was in the range of from 0.1 to 5.0 mass %, the 64 to 81% cycle characteristics and the 69 to 84% capacity preservation rate were much larger than those in comparative examples 1 to 3, where the 1,3-dioxane (DOX) was outside the above range and the cycle characteristics were from 44 to 48% and the capacity preservation rate was from 25 to 38%. Table 1 also shows that in examples 1 to 5 and comparative example 3, where the content of the 1,3-dioxane (DOX) was 0.1 mass % or more, the amount of gas generation was from 1.7 to 2.3 ml, which was smaller than 2.9 ml and 3.1 ml respectively of comparative examples 1 and 2, where the content of the 1,3-dioxane (DOX) was less than 0.1 mass %.

While what caused the above results is not definitely understood, the following is a possible explanation. The 1,3-dioxane (DOX) is lower than ethylene carbonate (EC) in oxidative decomposition potential. This causes DOX to be oxidative-decomposed before EC is to form a stable coating film on the positive electrode surface. The coating film acts to inhibit decomposition of EC. This minimizes the amount of gas generated as a result of decomposition of EC and minimizes a reduction in cell capacity caused by decomposition of EC. However, if DOX is contained in large amounts, the coating film of the DOX becomes excessively dense, which prevents smooth intercalation and disintercalation of lithium ions, resulting in a reduction in cell capacity.

A comparison of examples 1 and 6 to 9 shows that compounds with a methyl group or an ethyl group bonded to the basic frame of the 1,3-dioxane provided similar advantageous effects.

Example 10

A non-aqueous electrolyte secondary cell according to example 10 was prepared in the same manner as in example 1 except that the solvent was a mixture of 40 mass parts of ethylene carbonate (EC) and 60 mass parts of propylene carbonate (PC).

Example 11

A non-aqueous electrolyte secondary cell according to example 11 was prepared in the same manner as in example 1 except that the solvent was a mixture of 45 mass parts of ethylene carbonate (EC) and 55 mass parts of propylene carbonate (PC).

Example 12

A non-aqueous electrolyte secondary cell according to example 12 was prepared in the same manner as in example 1 except that the solvent was a mixture of 60 mass parts of ethylene carbonate (EC) and 40 mass parts of propylene carbonate (PC).

Example 13

A non-aqueous electrolyte secondary cell according to example 13 was prepared in the same manner as in example 1 except that the solvent was a mixture of 40 mass parts of ethylene carbonate (EC), 20 mass parts of propylene carbonate (PC), and 40 mass parts of diethyl carbonate (DEC).

Example 14

A non-aqueous electrolyte secondary cell according to example 14 was prepared in the same manner as in example 1 except that the solvent was a mixture of 40 mass parts of ethylene carbonate (EC), 20 mass parts of propylene carbonate (PC), 20 mass parts of diethyl carbonate (DEC), and 20 mass parts of ethyl methyl carbonate (EMC).

Example 15

A non-aqueous electrolyte secondary cell according to example 15 was prepared in the same manner as in example 1 except that the solvent was a mixture of 30 mass parts of ethylene carbonate (EC), 10 mass parts of propylene carbonate (PC), and 60 mass parts of diethyl carbonate (DEC).

Example 16

A non-aqueous electrolyte secondary cell according to example 16 was prepared in the same manner as in example 1 except that the solvent was a mixture of 35 mass parts of ethylene carbonate (EC), 10 mass parts of propylene carbonate (PC), and 55 mass parts of diethyl carbonate (DEC).

Comparative Example 4

A non-aqueous electrolyte secondary cell according to comparative example 4 was prepared in the same manner as in example 1 except that the solvent was a mixture of 35 mass parts of ethylene carbonate (EC) and 65 mass parts of propylene carbonate (PC).

Comparative Example 5

A non-aqueous electrolyte secondary cell according to comparative example 5 was prepared in the same manner as in example 1 except that the solvent was a mixture of 40 mass parts of ethylene carbonate (EC), 10 mass parts of propylene carbonate (PC), and 50 mass parts of diethyl carbonate (DEC).

Comparative Example 6

A non-aqueous electrolyte secondary cell according to comparative example 6 was prepared in the same manner as in example 1 except that the solvent was a mixture of 40 mass parts of ethylene carbonate (EC) and 60 mass parts of diethyl carbonate (DEC).

Comparative Example 7

A non-aqueous electrolyte secondary cell according to comparative example 7 was prepared in the same manner as in comparative example 6 except that the 1,3-dioxane was not added.

(Supplementary Remarks)

To the mixture solvent of ethylene carbonate and propylene carbonate, a non-aqueous solvent of carbonate, lactone, ketone, ether, ester, or the like may be added. Specifically, in addition to the solvents used in the above examples, butylene carbonate, dimethyl carbonate, γ-butyrolactone, γ-valerolactone, γ-dimethoxyethane, tetrahydrofuran, 1,4-dioxane, and the like may be used. In view of improvement in discharge characteristics, use of chain carbonates is particularly preferred.

As the electrolytic salt, instead of $LiPF_6$, for example, $LiBF_4$, $LiAsF_6$, $LiCF_3SO_3$, $LiN(CF_3SO_2)_2$, $LiN(C_2F_5SO_2)_2$, $LiClO_4$, or the like may be used alone or in combination of equal to or more than two of the foregoing. The amount thereof dissolved in the non-aqueous solvent is preferably 0.5 to 2.0 mole/liter.

As the positive electrode active material used for the non-aqueous electrolyte secondary cell according to the present

TABLE 2

|  | EC (mass %) | PC (mass %) | DEC (mass %) | EMC (mass %) | EC/ (PC + EC) | Cycle characteristics (%) | Charging preservation characteristics | |
|---|---|---|---|---|---|---|---|---|
|  |  |  |  |  |  |  | Gas generation (ml) | Preservation rate (%) |
| Com. Ex. 4 | 35 | 65 | 0 | 0 | 0.35 | 34 | 1.4 | 45 |
| Ex. 10 | 40 | 60 | 0 | 0 | 0.40 | 66 | 1.2 | 71 |
| Ex. 11 | 45 | 55 | 0 | 0 | 0.45 | 73 | 1.5 | 80 |
| Ex. 1 | 50 | 50 | 0 | 0 | 0.50 | 81 | 1.7 | 82 |
| Ex. 12 | 60 | 40 | 0 | 0 | 0.60 | 83 | 1.6 | 84 |
| Ex. 13 | 40 | 20 | 40 | 0 | 0.67 | 79 | 1.9 | 79 |
| Ex. 14 | 40 | 20 | 20 | 20 | 0.67 | 77 | 2.1 | 81 |
| Ex. 15 | 30 | 10 | 60 | 0 | 0.75 | 68 | 2.3 | 74 |
| Ex. 16 | 35 | 10 | 55 | 0 | 0.78 | 62 | 2.2 | 72 |
| Com. Ex. 5 | 40 | 10 | 50 | 0 | 0.80 | 40 | 3.4 | 53 |
| Com. Ex. 6 | 40 | 0 | 60 | 0 | 1.00 | 34 | 4.7 | 39 |
| Com. Ex. 7 | 40 | 0 | 60 | 0 | 1.00 | 36 | 5.1 | 33 |

Table 2 shows that in examples 1 and 10 to 16, where the ratio of EC to the total mass of EC and PC was in the range of from 0.40 to 0.78, the 62 to 83% cycle characteristics and the 71 to 84% capacity preservation rate were much larger than those in comparative examples 4 to 7, where the ratio of EC was outside the above range and the cycle characteristics were from 34 to 40% and the capacity preservation rate was from 33 to 53%. Table 2 also shows that in examples 1 and 10 to 16, and comparative example 4, where the ratio of EC to the total mass of EC and PC was equal to or less than 0.78, the amount of gas generation was from 1.2 to 2.3 ml, which was smaller than 3.4 to 5.1 ml of comparative examples 5 to 7, where the ratio of EC was more than 0.78.

A possible explanation for the results is as follows. A low mixture ratio of EC to the combination of EC and PC causes PC to be reductive-decomposed at the negative electrode to form a coating film. Since the coating film is low in lithium ion conductivity, the discharging capacity is reduced. If, on the other hand, the mixture ratio of EC to the combination of EC and PC is high, even the addition of the 1,3-dioxane compound cannot inhibit the oxidative decomposition of EC at the positive electrode, and thus, the amount of gas generation increases and the discharging capacity is reduced.

invention, in place of the above-described cobalt acid lithium ($Li_xCoO_2$, $0<x\leq1.1$), nickel lithium oxide ($Li_xNiO_2$), manganese lithium oxide ($Li_xMnO_2$, $Li_xMn_2O_4$), or compound in which any of the foregoing transition metal elements is substituted with another element (e.g., $Li_xCo_yNi_{1-y}O_2$, $Li_xCo_yNi_zMn_{1-y-z}O_2$) may be used alone or in combination of two or more of the foregoing.

As the negative electrode material, instead of graphite, a carbonaceous matter (e.g., acetylene black, carbon black, and non-crystalline carbon) capable of intercalating and disintercalating lithium ions, a silicon matter, metal lithium, lithium alloy, and a metal oxide capable of intercalating and disintercalating lithium ions may be used alone or in combination of two or more of the foregoing.

What is claimed is:

1. A non-aqueous electrolyte secondary cell comprising:
   a positive electrode;
   a negative electrode; and
   a non-aqueous electrolyte containing a non-aqueous solvent and an electrolyte salt, wherein:
   the non-aqueous solvent contains ethylene carbonate and propylene carbonate, the ratio of the ethylene carbonate to the total mass of the ethylene carbonate and the propylene carbonate being from 0.40 to 0.78; and the non-aqueous electrolyte contains a 1,3-dioxane compound at a mass % of from 0.1 to 5.0, the 1,3-dioxane compound being represented by Formula 1:

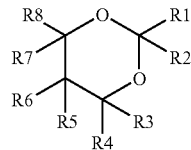

where R1 to R4 independently denote a hydrogen atom, a methyl group, or an ethyl group.

2. The non-aqueous electrolyte secondary cell according to claim 1, wherein the amount of the 1,3-dioxane compound contained in the non-aqueous electrolyte is from 0.5 to 3.0 mass %.

3. The non-aqueous electrolyte secondary cell according to claim 1, wherein the 1,3-dioxane compound is 1,3-dioxane.

4. The non-aqueous electrolyte secondary cell according to claim 2, wherein the 1,3-dioxane compound is 1,3-dioxane.

5. The non-aqueous electrolyte secondary cell according to claim 1, wherein the combined volume of the ethylene carbonate and the propylene carbonate is from 20 to 100 volume % of the total volume of the non-aqueous solvent at 1 atm. and 25° C.

6. The non-aqueous electrolyte secondary cell according to claim 2, wherein the combined volume of the ethylene carbonate and the propylene carbonate is from 20 to 100 volume % of the total volume of the non-aqueous solvent at 1 atm. and 25° C.

7. The non-aqueous electrolyte secondary cell according to claim 3, wherein the combined volume of the ethylene carbonate and the propylene carbonate is from 20 to 100 volume % of the total volume of the non-aqueous solvent at 1 atm. and 25° C.

8. The non-aqueous electrolyte secondary cell according to claim 4, wherein the combined volume of the ethylene carbonate and the propylene carbonate is from 20 to 100 volume % of the total volume of the non-aqueous solvent at 1 atm. and 25° C.

* * * * *